United States Patent [19]

Sunakoda et al.

[11] 4,236,606
[45] Dec. 2, 1980

[54] FRICTION BRAKING TYPE VIBRATION DAMPER

[76] Inventors: Katsuaki Sunakoda, Shimookamoto 3779-8, Kawachi-machi, Kawachi-gun, Tochigi-ken, Japan; Yoshikazu Ito, 3747-2, Shimookamoto, Kiwachi-machi, Kawachi-gun, Tochigi-ken, Japan

[21] Appl. No.: 956,575

[22] Filed: Nov. 1, 1978

[30] Foreign Application Priority Data

Dec. 13, 1977 [JP] Japan ................................ 52-148798

[51] Int. Cl.³ .............................................. F16D 63/00
[52] U.S. Cl. .................... 188/1 B; 188/134; 248/562
[58] Field of Search ............... 188/134, 129, 187, 1 B; 248/562, 566

[56] References Cited

U.S. PATENT DOCUMENTS

| 2,847,869 | 8/1958 | Hogan et al. | 188/134 X |
|---|---|---|---|
| 3,809,186 | 5/1974 | Suozzo | 188/129 X |
| 4,105,098 | 8/1978 | Klimaitis | 188/134 |

*Primary Examiner*—Douglas C. Butler
*Attorney, Agent, or Firm*—Holman & Stern

[57] ABSTRACT

A vibration snubber for earthquake protection of piping including an auxiliary cylinder axially slidable in a main cylinder having a large diameter portion. The large diameter portion houses a flywheel which is secured to a rotatable center shaft. One end of the shaft is mounted in a bearing in the cylinder end. The other end is threaded and screwed into a conventional screw nut fixed on one end of the auxiliary case. A spacing collar is provided between the flywheel and the bearing. The inner end surface of the large diameter portion has a chamferred friction bearing surface. A movable wheel is rotatably and slidably mounted on the spacing collar. The movable wheel is cylindrical, concentrically surrounding the flywheel. A spring mounted between a spring-receiving ring on the movable wheel and a spring-receiving flange on the flywheel presses the movable wheel against the flywheel. An annular friction surface corresponding to the friction bearing surface is formed on the movable wheel surface facing the end of the main cylinder. At least one ball rides in corresponding conical recesses in opposing faces of the movable wheel and flywheel. When the movable wheel leads or lags the flywheel by inertia, the ball rides up on the surfaces of the conical recesses, pushing the movable wheel away from the flywheel, causing the friction surfaces to contact each other, thereby slowing the assembly by friction braking. The friction bearing surface axial position can be adjustable.

6 Claims, 3 Drawing Figures

FRICTION BRAKING TYPE VIBRATION DAMPER

BACKGROUND OF THE INVENTION

This invention relates to a vibration snubbing devices to be used to protect piping in power generating plants or chemical plants by allowing any slow displacement of the pipe by thermal expansion or the like but applying an effective vibration controlling action to quick vibrations caused by earthquakes or the like.

Oil pressure vibration snubbers are well-known in the prior art. They suffer from the disadvantage that over a period of years, a reduction in the performance of the unit occurs because of age-deteriorations of the oil and seal materials.

In the present invention, all the members are formed to be mechanically operated so that the performance can be permanently maintained and can be utilized even in nuclear plants which are required to be maintenance-free.

SUMMARY OF THE INVENTION

In order to attain the above object the present invention comprises a fixed wheel secured within a vibration snubber and a rotatable movable wheel capable of moving toward or away from the fixed wheel so that, when quick vibrations act on the piping, the movable wheel being caused to reciprocate and rotate with them will be pushed out toward the fixed wheel by interaction with an inertial flywheel thereby generating braking action by the contact friction of both wheels.

DETAILED DESCRIPTION OF PREFERRED EMBODIMENTS

Figure 1:
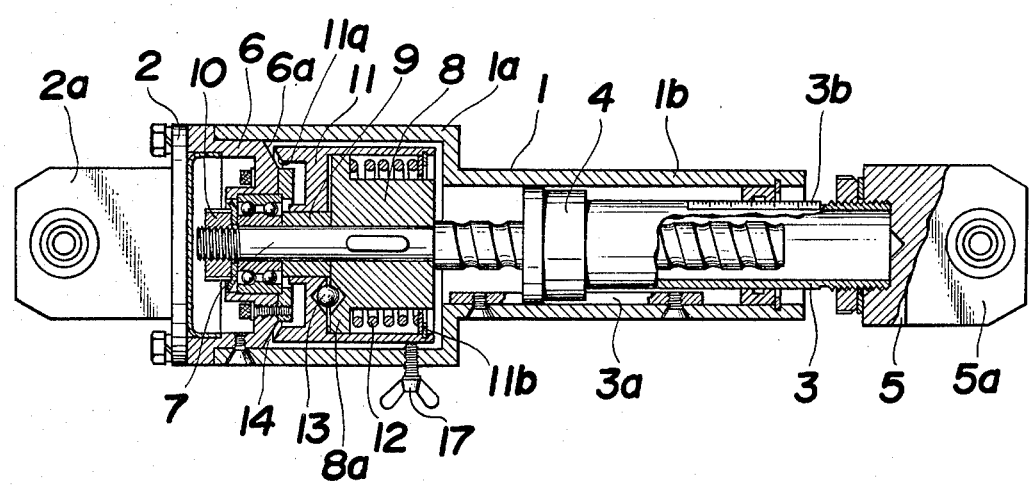
FIG. 1 is a cross-sectional view of the present invention.

Two embodiments of the present invention are described hereinbelow with reference to the drawings in which the like numerals refer to like components throughout the several views.

A friction braking type of vibration snubber, according to the present invention, comprises a pair of supporting members fitted to make axially reciprocating motions relatively with each other. One of the supporting members is a main cylinder 1 consisting of a large diameter portion 1a and a small diameter portion 1b. An end closure 2 is secured to one end of the large diameter portion 1a. A connecting lug 2a is mounted on the closure 2 for connecting the snubber to either a support or the piping. An auxiliary cylinder 3 is slidably mounted in the small diameter portion 1b. The auxiliary cylinder 3 is also provided with an end closure 5 carrying a connecting lug 5a for connection to either a support or the piping. A screw nut 4 of conventional design is secured to the opposite end of the auxiliary cylinder 3. The small diameter portion 1b of the main cylinder 1 has a key 3a secured therein upon which the auxiliary cylinder 3 rides. Thus the auxiliary cylinder 3 is axially movable within the main cylinder 1 and is prevented from rotating therein.

A fixed wheel 6 is fixed to the main cylinder 1 inside of the large diameter portion 1a. A chamfered circumferential friction bearing surface 6a is provided on the outer periphery of the fixed wheel 6 facing the auxiliary cylinder 3. The fixed wheel 6 has a centrally located bearing hole therethrough.

A rotatable flywheel 8 is housed within the large diameter portion 1a of the main cylinder 1.

Means for converting the relative axial motions of the pair of supporting members into rotary motions of the flywheel are contained within the main cylinder 1 and the auxiliary cylinder 3. These means comprise the screw nut 4 and a center shaft 7. The center shaft 7 is rotatably borne at one end in the bearing hole of the fixed wheel 6 by a bearing means and has a threaded portion on the other end. The threaded portion is screwed through the screw nut 4. The flywheel 8 is secured to the center shaft 7. Thus as the auxiliary cylinder 3 and the main cylinder 1 are moved axially, the motion is converted to rotary motion of the center shaft 7 and the flywheel 8. A nut 10 is fitted to the center shaft end. A spacing collar 9 is provided between the flywheel 8 and the bearing means. The nut 10 holds the assembly onto the center shaft 7.

A movable wheel 11 is slidably and rotatably fitted on the spacing collar 9 within the large diameter portion 1a of the main cylinder 1. The movable wheel 11 is shaped as an open-ended cylinder. An annular friction surface 11a is provided on the closed end portion. The annular friction surface 11a corresponds to the friction bearing surface 6a of the fixed wheel 6. The movable wheel 11 is free to rotate and slide axially on the spacing collar 9.

Means for rotationally interconnecting the movable wheel 11 and the flywheel 8 and for moving the movable wheel 11 axially away from the flywheel 8 upon a difference in rotational speed between them are provided. These means include conical recesses made in respective corresponding positions on the opposed surfaces of the movable wheel 11 and the flywheel 8. At least one ball 13 rides in the conical recesses. Thus as the movable wheel 11 leads or lags behind the flywheel 8 upon quick movements of the snubber due to earthquakes or the like, the at least one ball 13 rides upon the sloping surfaces of the conical recesses pushing the movable wheel 11 away from the flywheel 8 and toward the fixed wheel 6. The annular friction surface 11a contacts the friction bearing surface 6a slowing the assembly by friction braking.

The movable wheel 11 and the flywheel 8 are pressed together by pressing means. The means for pressing the two together comprises a push spring 12. The open end of the cylinder forming the movable wheel 11 is fitted internally with a spring-receiving ring 11b near its outer end. The flywheel 8 formed with a spring-receiving flange 8a on one end thereof opposite the open end of the cylinder forming the movable wheel 11. The flywheel 8 is concentrically positioned within the movable wheel 11. The push spring 12 is inserted between the spring-receiving flange 8a and the spring-receiving ring 11b. The preferred form of the push spring 12 is helical surrounding the flywheel 8. Thus the flywheel 8 and the movable wheel 11 are pressed together leaving a proper clearance 14 between the annular friction surface 11a and the friction bearing surface 6a.

A screw hole can be made in the radial direction in the large diameter portion 1a of the main cylinder 1 so that the movable wheel 11 can be fixed in one position to the main cylinder 1 as required by a set screw 17 screwed through the screw hole.

Figure 2:
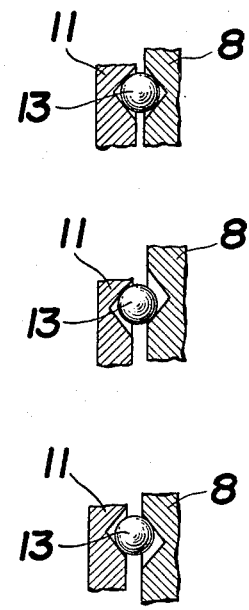
FIG. 2 is an explanatory view of the engagement of a flywheel and movable wheel with each other.

The present invention is formed as in the above and is used with one of the lugs 2a and 5a connected to a structure and the other to piping. When the piping is stationary, the vibration snubber will be also stationary with the clearance 14 left as it is. In case the piping moves slowly due to thermal expansion or the like, the auxiliary cylinder 3 will slowly move with respect to the center shaft 7 and the flywheel 8 will also rotate with it. However, the rotating velocity is so low that the movable wheel 11 will also rotate integrally with the flywheel 8 through the ball 13. Thus, the displacement of the piping will not be obstructed. However, in the case when such quick vibrations as by earthquakes or the like act on the piping, the flywheel 8 will repeat quick reciprocating rotations but, due to inertia, the movable wheel 11 will not be able to perfectly follow it. In the case of either normal and reverse rotations, as shown in FIG 2, the ball 13 will ride on the slopes of the conical recesses and will push out the movable wheel 11 toward the fixed wheel 6. Once the clearance 14 is closed, friction surface 11a will interact with friction surface 6a to cause contact friction forces to repeatedly act between both wheels to effect a vibration snubbing action.

In the case when the distance between the structure and piping in the vibration snubber fitting place is known, the distance between both lugs 2a and 5a can be adjusted in advance to correspond to it and the set screw 17 is kept screwed in so that the fitting work in the field may be made so simple as only to remove the set screw 17 to make the vibration snubber usable. Further, for the convenience of the above-mentioned adjustment, a scale 3b is provided on the outer periphery of the auxiliary cylinder 3.

Figure 3:
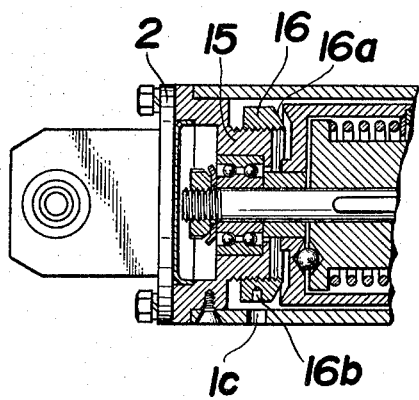
FIG. 3 is an elevation of another embodiment of a fixed wheel.

In the present invention, it is important to properly select the clearance 14. Thus the clearance can be made adjustable. The fixed wheel 15 provided with a boss as is exemplified in FIG. 3 may be used instead of the fixed wheel 6 of FIG. 1. The boss may be threaded on its outer periphery and the friction ring 16 may be screwed on it. The friction ring 16 is provided with a friction bearing surface 16a corresponding to the annular friction surface 11a. Further, a radial hole 16b can be made in the friction ring 16 and an arcuate slot 1c corresponding to it can be made in the main cylinder. An adjusting rod (not illustrated) passing through the slot 1c is inserted into the hole 16 and is rotated for the adjustment. The adjusting rod can be utilized also to prevent the loosening of the ring 16 by being fixed in a fixed angular position.

In the already extensively used oil pressure vibration snubber, the reduction of the performance by the variation of the oil with the lapse of years has been hard to avoid, whereas the present invention is completely formed of mechanically operating parts as in the above and has the feature of being able to permanently maintain the performance as described at the beginning.

What is claimed is:

1. A friction braking type vibration snubber comprising a pair of supporting members fitted to make axially reciprocating motions relative each other, one of said members having a friction braking surface; a rotatable flywheel having a first surface, means for converting the relative axial motion of said pair of supporting members to rotary motions of said flywheel, a movable wheel having a second surface facing said first surface and rotatable relative to and with said flywheel and movable in the axial direction toward and away from said braking surface, and means for rotationally interconnecting said movable wheel and said flywheel and for moving said movable wheel axially away from said flywheel and toward engagement with said braking surface upon a difference in rotational speed between said movable wheel and flywheel, said means for interconnecting and moving comprising generally opposed recesses of generally conical cross-section defined in said first and second facing surfaces and at least one ball inserted between said opposed recesses to transmit the rotary motions of said flywheel to said movable wheel to rotate it, said at least one ball allowing the delayed rotations of said movable wheel to said flywheel and said delayed rotations bringing about the direct contact of said movable wheel with said friction braking surface.

2. The friction braking type vibration snubber according to claim 1 further comprising means for pressing said flywheel and said movable wheel together; and wherein one of said pair of supporting members is a main cylinder, the other of said pair is an auxiliary cylinder inserted in said main cylinder so as to be free to advance and retreat in the axial direction, said friction braking surface being fixed to the inner end surface of said main cylinder; said means for converting said relative axial motions to the rotary motions comprises a screw nut non-rotatably and axially movably mounted in said auxiliary cylinder and a center shaft rotatably in a bearing means at one end in said main cylinder and provided in the other end part with a threaded portion screwed onto said screw nut, said flywheel being secured to this center shaft, said movable wheel fitted rotatably on said center shaft and movable in said axial direction; and said main cylinder having a guide key secured therein, said screw nut riding on said guide key to permit non-rotatable axial movement of said auxiliary cylinder.

3. The friction braking type vibration snubber according to claim 2 wherein said movable wheel comprises a cylinder opened at one end, and has on its other end an annular friction surface facing said friction braking surface, said open end having on the outer periphery of the open end part a spring-receiving ring, said flywheel being concentrically positioned within said movable wheel and having in the inner end part opposite the outer periphery of said open end of said cylinder a spring-receiving flange; and said means for pressing comprises a push spring inserted between said spring-receiving flange and said spring-receiving ring whereby said movable wheel is always pressed toward said flywheel.

4. The friction braking type vibration snubber according to claim 2 or 3 further comprising a spacing collar between said flywheel and said bearing means and a nut screwed to the borne end of said center shaft so that the position of said center shaft is adjustable.

5. The friction braking type vibration snubber according to claim 4 further comprising means for adjustably moving said friction braking surface in the axial direction.

6. The friction braking type vibration snubber according to claim 2 further comprising means for adjustably moving said friction braking surface in the axial direction.

* * * * *